(12) United States Patent
Lee et al.

(10) Patent No.: US 7,712,971 B2
(45) Date of Patent: May 11, 2010

(54) OPTICAL CONNECTOR

(75) Inventors: Jae-Soo Lee, Gwangju (KR);
Hyung-Gon Jeong, Jeollanam-do (KR);
Yong-Hyun Kim, Gwangju (KR);
Dong-Keun Kim, Gwangju (KR);
Yong-Moo Lim, Gwangju (KR);
Jeong-Bin Lee, Jeonju (KR); Yong-Woo Yi, Gwangju (KR)

(73) Assignee: Goldtel Co., Ltd., Gwangju (KR)

( * ) Notice: Subject to any disclaimer, the term of this patent is extended or adjusted under 35 U.S.C. 154(b) by 105 days.

(21) Appl. No.: 11/571,108

(22) PCT Filed: Jun. 20, 2005

(86) PCT No.: PCT/KR2005/001904

§ 371 (c)(1),
(2), (4) Date: Dec. 21, 2006

(87) PCT Pub. No.: WO2006/004328

PCT Pub. Date: Jan. 12, 2006

(65) Prior Publication Data

US 2008/0080815 A1    Apr. 3, 2008

(30) Foreign Application Priority Data

Jun. 30, 2004  (KR) ................. 10-2004-0050284

(51) Int. Cl.
*G02B 6/38* (2006.01)
(52) U.S. Cl. .......................... 385/62; 385/81
(58) Field of Classification Search ............. 385/53, 385/62, 87, 81
See application file for complete search history.

(56) References Cited

U.S. PATENT DOCUMENTS

| | | | | |
|---|---|---|---|---|
| 4,435,036 A | * | 3/1984 | Sasakawa | 385/81 |
| 4,515,434 A | * | 5/1985 | Margolin et al. | 385/65 |
| 4,605,281 A | * | 8/1986 | Hellewell | 385/70 |
| 4,747,659 A | * | 5/1988 | Takahashi | 385/67 |

(Continued)

FOREIGN PATENT DOCUMENTS

JP   2003-270487   9/2003

(Continued)

OTHER PUBLICATIONS

K. Tatsuno et al "Fiber-Pigtail-Detachable Plastic MiniDIL Transmitter Module with a Tool-Free Optical Connector", Apr. 2003, vol. 21 No. 4, pp. 1066-1070, Journal of Ligtwave Technology.

*Primary Examiner*—Frank G Font
*Assistant Examiner*—Peter Radkowski
(74) *Attorney, Agent, or Firm*—IPLA P.A.; James E. Bame

(57) ABSTRACT

Disclosed herein is an optical connection. In the present invention, an element wire is removably fastened to the optical connector by tightening a main wire connection member using a tightening member from a state in which a plug, a main wire aligning member, a spring, a fastening member, the main wire connection member and the tightening member are previously assembled together. Consequently, only a related optical line need be repaired or replaced with another one, so that the optical line connection work is markedly simplified and can be performed conveniently. Furthermore, there is an advantage of efficient reuse of components.

5 Claims, 8 Drawing Sheets

U.S. PATENT DOCUMENTS

| | | | |
|---|---|---|---|
| 4,964,685 A * | 10/1990 | Savitsky et al. | 385/58 |
| 5,082,344 A * | 1/1992 | Mulholland et al. | 385/60 |
| 5,107,536 A * | 4/1992 | Wall | 385/81 |
| 5,142,598 A * | 8/1992 | Tabone | 385/78 |
| 5,212,752 A * | 5/1993 | Stephenson et al. | 385/78 |
| 5,265,183 A * | 11/1993 | Feng et al. | 385/78 |
| 5,661,843 A * | 8/1997 | Rickenbach et al. | 385/147 |
| 5,852,694 A * | 12/1998 | Kimura et al. | 385/78 |
| 5,892,870 A * | 4/1999 | Fingler et al. | 385/59 |
| 6,357,933 B1 * | 3/2002 | Bradley et al. | 385/81 |
| 6,435,730 B1 * | 8/2002 | Kevern et al. | 385/78 |
| 6,854,897 B2 * | 2/2005 | Furumai et al. | 385/73 |
| 6,916,120 B2 * | 7/2005 | Zimmel et al. | 385/78 |
| 7,052,187 B2 * | 5/2006 | Ohtsuka et al. | 385/60 |
| 7,121,734 B2 * | 10/2006 | Taira | 385/78 |
| 7,201,518 B2 * | 4/2007 | Holmquist | 385/60 |
| 7,264,402 B2 * | 9/2007 | Theuerkorn et al. | 385/59 |
| 2005/0232553 A1 * | 10/2005 | Holmquist | 385/78 |
| 2005/0232554 A1 * | 10/2005 | Zimmel et al. | 385/78 |
| 2006/0204178 A1 * | 9/2006 | Theuerkorn et al. | 385/59 |

FOREIGN PATENT DOCUMENTS

| | | |
|---|---|---|
| JP | 2003270487 A * | 9/2003 |
| JP | 2006119293 A * | 5/2006 |

* cited by examiner

000
OPTICAL CONNECTOR

TECHNICAL FIELD

The present invention relates, in general, to optical connectors and, more particularly, to an optical connector which makes it possible for optical fibers to be easily connected to each other on site without an increase in connection loss.

BACKGROUND ART

Other many times, the optical connectors have been widely used in optical fiber distribution frames and optical network units, in connecting optical lines to each other, in connecting optical fiber cables to each other, and as input-output terminals for optical measuring equipment.

As shown in FIGS. 1 and 2, a conventional optical connector includes a housing 100 which surrounds and protects components, a plug 200 which is movably inserted in the housing 100, and a main wire aligning member 300 which is movably inserted in the plug 200. The optical connector further includes a fastening member 500 which is inserted into the plug 200 while surrounding a portion of the main wire aligning member 300 that protrudes into the plug 200, a spring 400 which is inserted into the fastening member 500 and elastically supports the main wire aligning member 300 in one direction, and a protective cover 600 which covers an end of the fastening member 500. An optical fiber (OF) is inserted into the fastening member 500 after passing through the protective cover 600. A main wire (B) of the optical fiber (OF) is inserted through and fastened to the main wire aligning member 300. Here, the reference character "A" denotes an element wire, that is, denotes the optical fiber (OF) which includes a core, a clad and a jacket (a first covering). The main wire (B) includes only the core and the clad, from which the covering is removed.

An optical line connection work using the conventional optical connector having the above-mentioned structure will be described herein below.

First, the element wire (A) is sequentially inserted into the protective cover 600, the fastening member 500 and the spring 400. After the jacket of an end of the element wire (A) is removed from the element wire (A), the main wire (B), from which the jacket is removed, is inserted through the main wire aligning member 300 and bonded to the main wire aligning member 300 using a bonding agent such as epoxy resin. To reduce connection loss, a portion of the main wire (B) which protrudes outside the main wire aligning member 300 is cut off, and the end of the main wire (B) is ground.

Subsequently, the main wire aligning member 300 is inserted into the plug 200, and the spring 400 and the fastening member 500, which are fitted over the element wire (A), are moved to the main wire aligning member 300, until the fastening member 500 is inserted into and fastened to the plug 200. Then, the main wire aligning member 300 is elastically supported by the spring 400 in one direction.

Thereafter, the protective cover 600, which is fitted over the element wire (A), is coupled to the fastening member 500. Subsequently, the plug 200 is inserted into the housing 100, thus completing the optical connector assembly.

The optical connector, assembled through the above-mentioned process, is removably coupled to an optical adaptor (not shown). As such, when the optical connector and the optical adaptor are coupled to each other, the main wires (B) of the optical fiber (OF), which are disposed in the optical connector and the optical adaptor, are coaxially brought into contact with each other. The coupling structure between the optical connector and the optical adaptor is a well known technique in related industries, therefore further explanation is deemed unnecessary.

However, in the conventional optical connector, because the main wire (B), which is exposed to the outside by removing the jacket from the element wire (A), is directly inserted through the main wire aligning member 300 and, thereafter, the free end of the main wire (B), which protrudes from the main wire aligning member 300, is cut off, ground, and directly connected to the element wire (not shown)) of the optical adaptor, optical line connection work and optical line repair and replacement work are very complex. Furthermore, it causes a problem of an increase in connection loss due to inaccuracy in the cutting and grinding process.

A more detailed description about thereof follows.

The free end of the main wire (B) which protrudes from the main wire aligning member 300 must be precisely cut and ground to reduce connection loss of the optical connector. In conventional arts, because the main wire (B) of the element wire (A) is directly connected to the optical adaptor, a worker must directly conduct a process of precisely cutting and grinding a main wire (B) every time at an optical line connection site. Due to this, the optical line connection process and the optical line repair and replacement process become very complex and difficult.

Furthermore, the process of cutting and grinding the main wire (B) requires high accuracy. However, because a worker must manually perform this process at an optical line connection site, tolerance may be increased according to conditions such as the skill of the worker and tools in use. Therefore, connection loss at a junction between optical lines connected by the optical connector is greatly increased.

Moreover, in the conventional optical connector, because the main wire (B) of the element wire (A), which is inserted through the main wire aligning member 300, is bonded to the main wire aligning member 300 using a bonding agent such as epoxy resin, optical line repair and replacement work is very complex and difficult. As well, when it is desired to repair an optical line or replace it with another one, because the whole main wire aligning member 300 along with the element wire (A) must be replaced with another one, a problem of a waste of recourses occurs.

DISCLOSURE OF INVENTION

Technical Problem

Accordingly, the present invention has been made keeping in mind the above problems occurring in the prior art, and an object of the present invention is to provide an optical connector which makes it possible for optical fibers to be easily connected to each other in an optical line connection site.

Technical Solution

In order to accomplish the above objects, the present invention provides an optical connector, including: a housing surrounding and protecting components; a plug movably inserted in the housing; a main wire aligning member movably inserted in the plug; a fastening member inserted into the plug while surrounding a portion of the main wire aligning member protruding into the plug; a spring inserted into the fastening member and elastically supporting the main wire aligning member in one direction; and a protective cover covering an end of the fastening member, wherein the optical connector further includes: a main wire connection member inserted into the fastening member and coupled to the main wire aligning member, which protrudes into the fastening member, the main wire connection member holding an optical fiber, inserted through a first end of the main wire connection member, into a clip type manner; and a tightening member removably coupled to the main wire connection member and tightening the main wire connection member such that the main wire connection member holds the optical fiber, inserted into the main wire connection member, in a clip type manner, so that a main wire of the optical fiber is removably inserted into and held by both the main wire connection member and the main wire aligning member.

BEST MODE FOR CARRYING OUT THE INVENTION

Hereinafter, the present invention will be described in detail with reference to the drawings.

Figure 1:
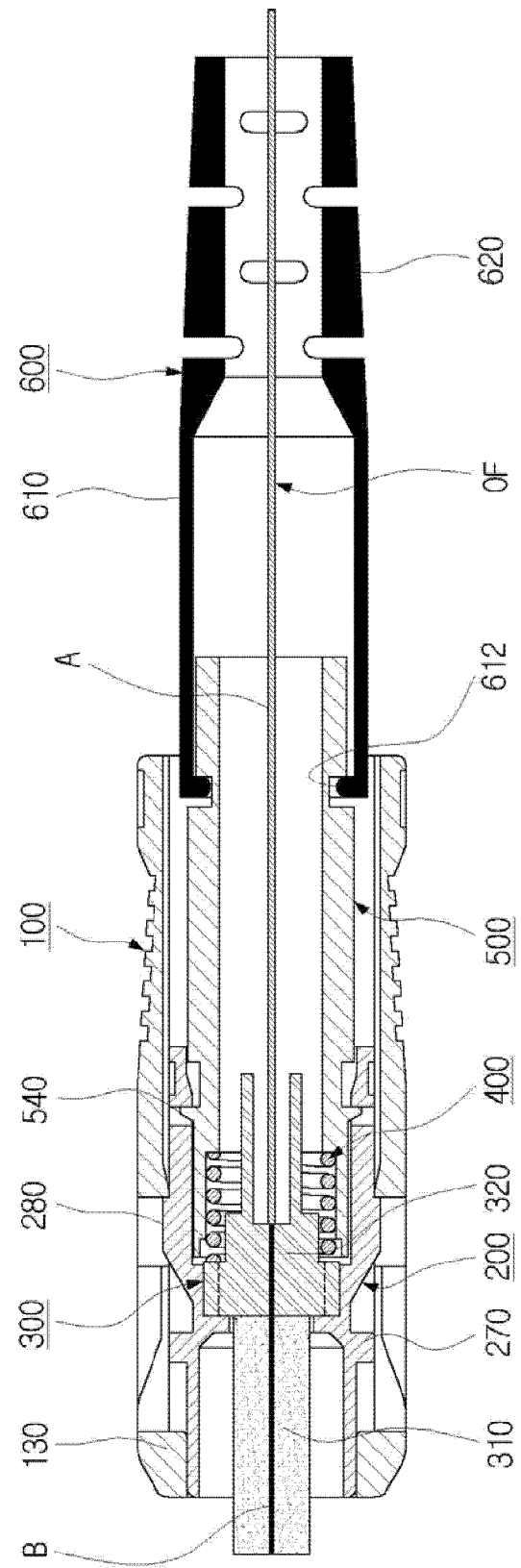
FIG. 1 is a sectional view showing a conventional optical connector.
Figure 2:
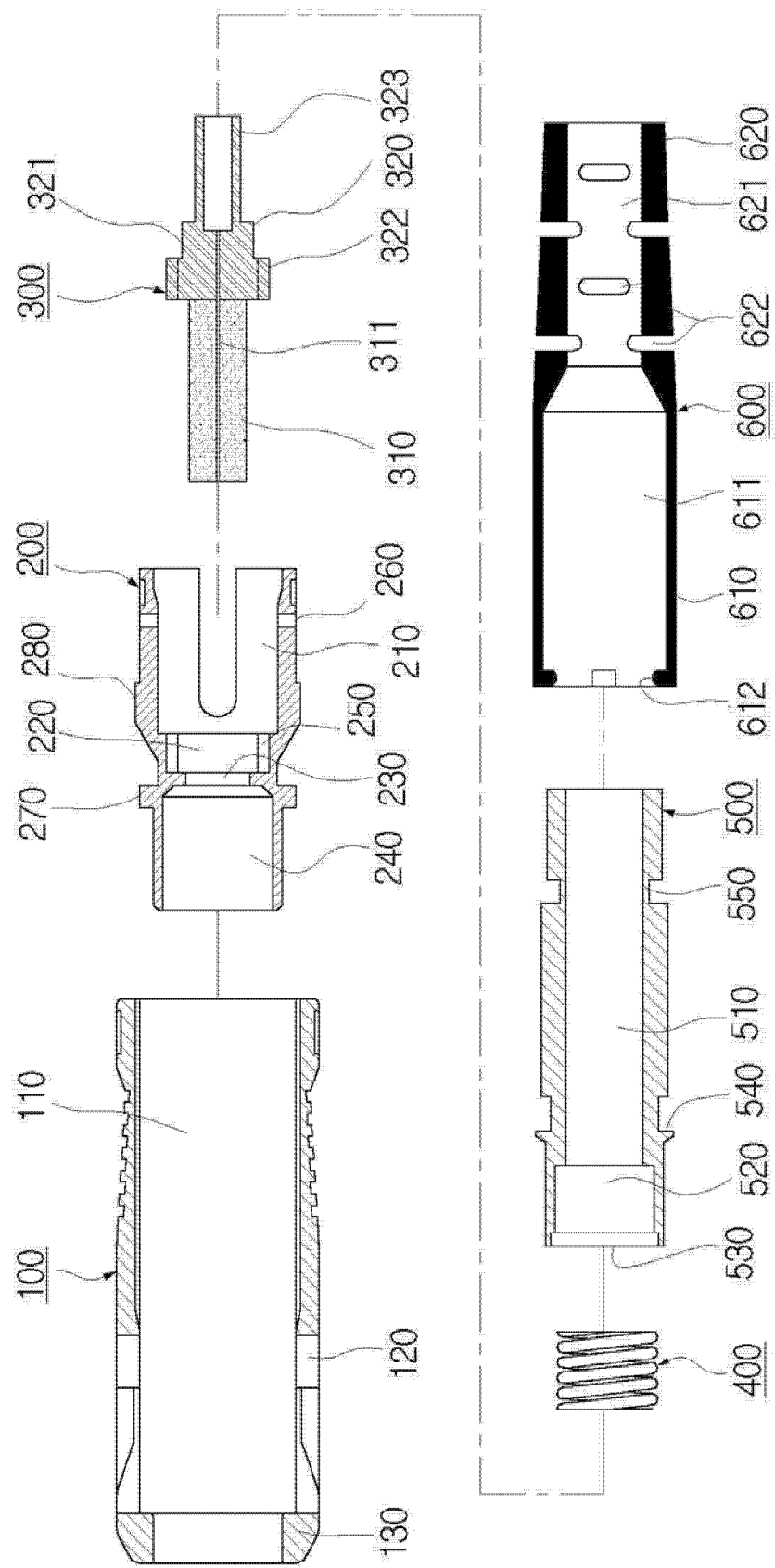
FIG. 2 is an exploded sectional view showing important parts of the optical connector of FIG. 1.
Figure 3:
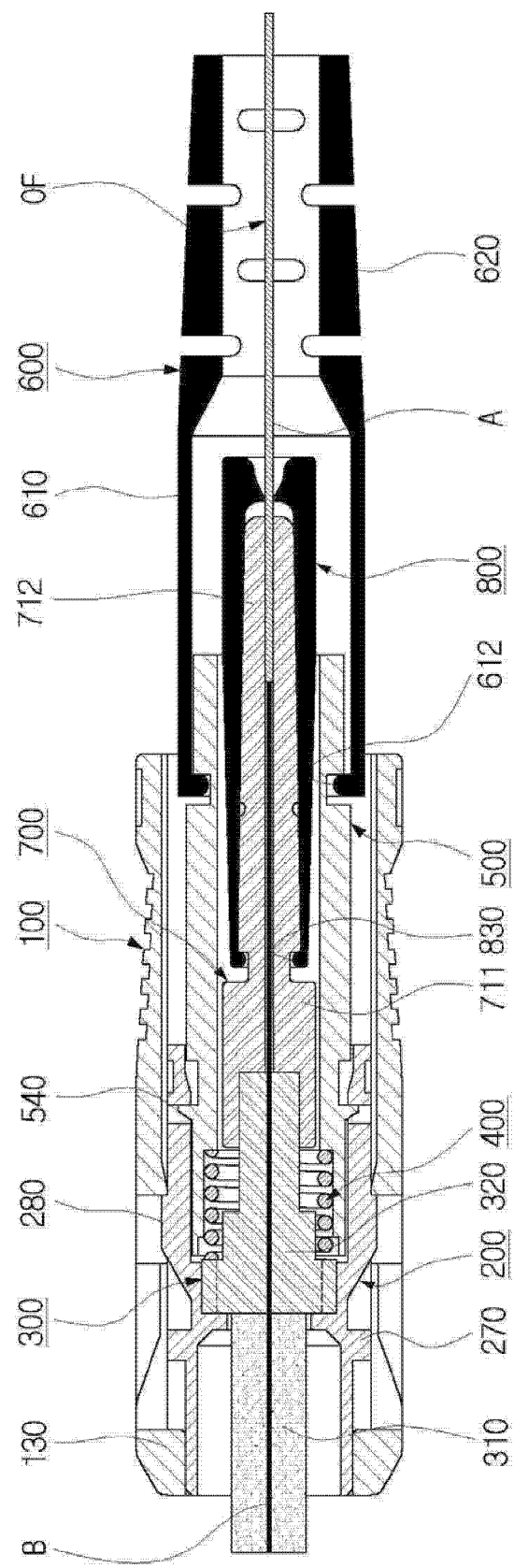
FIG. 3 is a sectional view of an optical connector, according to the present invention.
Figure 4:
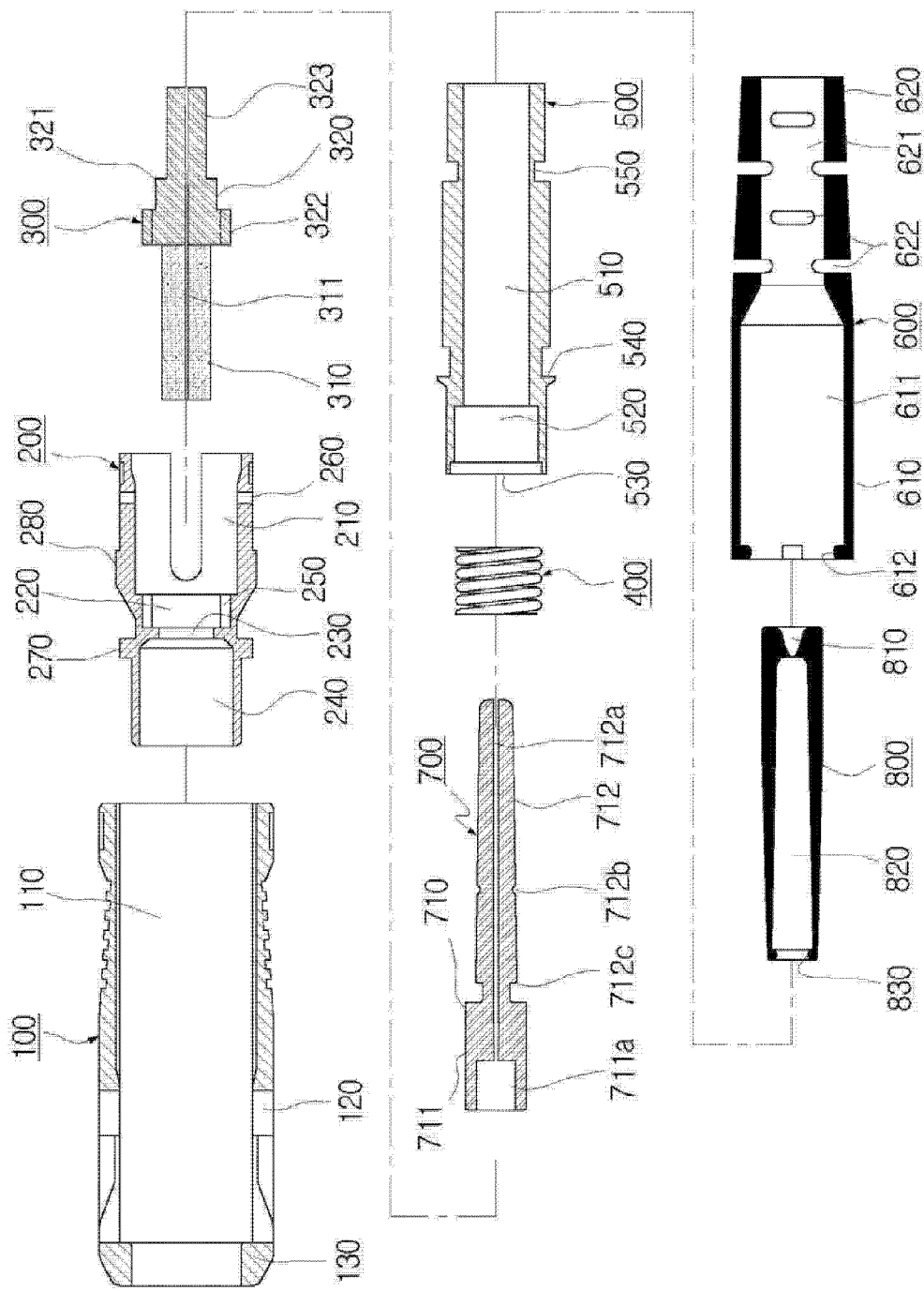
FIG. 4 is an exploded sectional view showing important parts of the optical connector of FIG. 3.
Figure 5:
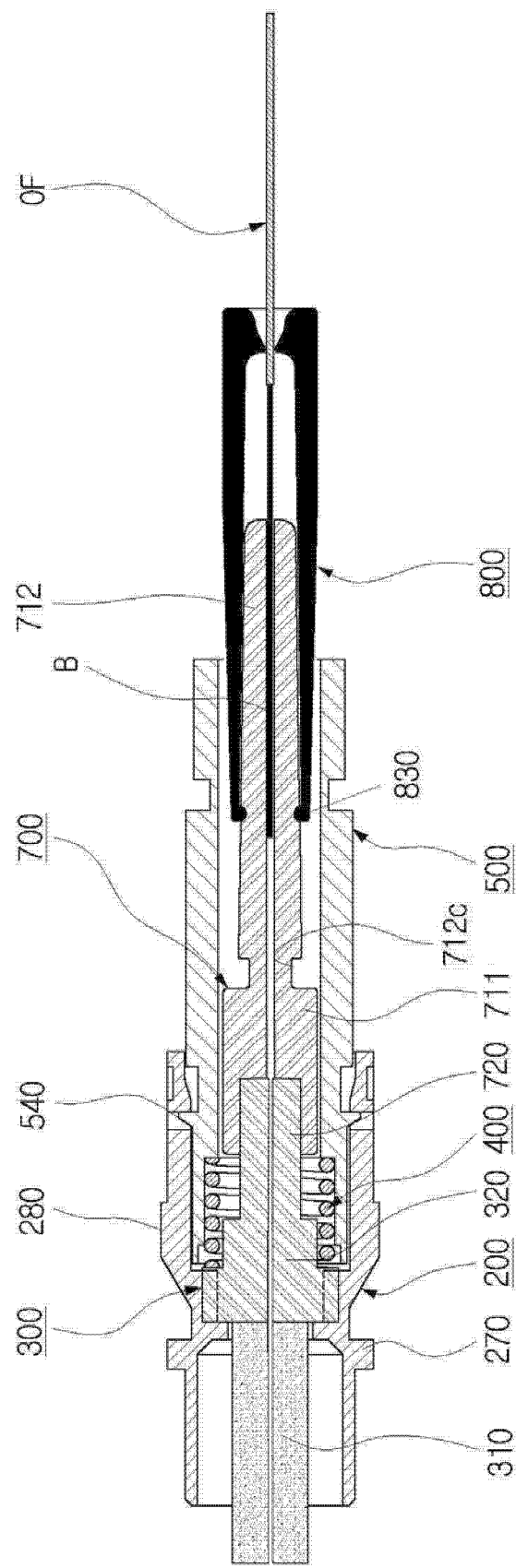
FIG. 5 is a sectional view showing an assembly of the optical connector according to the present invention.

FIGS. 3 through 5 are views showing an optical connector according to the present invention. The same reference numerals are used to designate the same components as those of the conventional art shown in FIGS. 1 and 2, and a detailed explanation of them will be omitted.

Referring to FIGS. 3 through 5, the optical connector of the present invention includes a housing 100 which surrounds and protects components, a plug 200 which is movably inserted in the housing 100, and a main wire aligning member 300 which is movably inserted in the plug 200. The optical connector further includes a fastening member 500 which is inserted into the plug 200 while surrounding a portion of the main wire aligning member 300 that protrudes into the plug 200, a spring 400 which is inserted into the fastening member 500 and elastically supports the main wire aligning member 300 in one direction, and a protective cover 600 which covers an end of the fastening member 500. The optical connector further includes a main wire connection member 700 which is inserted into the fastening member 500 and is coupled to the main wire aligning member 300 that protrudes into the fastening member 500. The main wire connection member 700 holds an optical fiber (OF), inserted through a first end of the main wire connection member 700, in a clip type manner. The optical connector further includes a tightening member 800 which is removably coupled to the main wire connection member 700 and tightens the main wire connection member 700 such that the main wire connection member 700 holds the optical fiber (OF), inserted into the main wire connection member 700, in a clip type manner, so that a main wire (B) of the optical fiber (OF) is removably inserted into and held by both the main wire connection member 700 and the main wire aligning member 300.

In this embodiment, the housing 100 has a receiving hole 110 which is longitudinally formed through the housing body, a guide hole 120 which is formed through the housing body from the inner surface of the receiving hole 110 to the outside, and a stop protrusion 130 which protrudes inwards from the inner surface of the receiving hole 110.

In the plug 200, a fastening member receiving hole 210, a flange receiving hole 220 having a diameter smaller than that of the fastening member receiving hole 210, a ferrule passing hole 230 having a diameter smaller than that of the flange receiving hole 220, and a coupling hole 240, into which an optical plug socket is inserted, are longitudinally formed through the plug 200 and communicate with each other. A rotation preventing groove 250 is formed in the inner surface of the flange receiving hole 220. A locking hole 260 is formed in the inner surface of the fastening member receiving hole 210. A stop protrusion 270, which is inserted into the receiving hole 110 of the housing 100 and is brought into contact with the stop protrusion 130 of the housing 100, and a locking protrusion 280, which is movably inserted into the guide hole 120 through the receiving hole 110 of the housing 100, are provided on the outer surface of the plug 200.

The main wire aligning member 300 includes a ferrule 310 which is inserted into the ferrule passing hole 230 of the plug 200 and protrudes into the coupling hole 240 while being spaced apart from the inner surface of the coupling hole 240 by a pre-determined distance, with a main wire insertion hole 311 formed through the ferrule 310 in a longitudinal direction. The main wire aligning member 300 further includes a flange 320 which is inserted into the flange receiving hole 220 of the plug 200. A main wire insertion hole 312 is formed through the flange 320 in a longitudinal direction. A rotation preventing protrusion 322 is provided on the outer surface of the flange 320 so that the rotation preventing protrusion 322 engages with the rotation preventing groove 250. A guide protrusion 323 having a pipe shape is provided on an end of the flange 320.

In the fastening member 500, a receiving hole 510, a spring seat hole 520 having a diameter larger than that of the receiving hole 510, and a buffer hole 530 having a diameter larger than that of the spring seat hole 520 are longitudinally formed through the fastening member 500 and communicate with each other. A locking protrusion 540, which is hooked to the locking hole 260 of the plug 200, and a locking groove 550, to which a locking protrusion 612 of the protective cover 600 is hooked, are provided on the outer surface of the fastening member 500. The fastening member 500 having the above-mentioned construction surrounds a portion of the flange 320 of the main wire aligning member 300 and is inserted into the fastening member receiving hole 210 of the plug 200.

Meanwhile, a coil spring is used as the spring 400 which is seated in the spring seat hole 520 of the fastening member 500 and elastically supports the flange 320 of the main wire aligning member 300 in one direction.

The protective cover 600 includes a receiving part 610, which has a receiving hole 611 therein, and the locking protrusion 612, which is provided on the end of the protective cover 600 so that the locking protrusion 612 is hooked to the locking groove 550 of the fastening member 500. The protective cover 600 further includes a bending part 620 which has a receiving hole 621, which communicates with the receiving hole 611 of the receiving part 610, and a bending motion accommodation groove 622 which is open from the inner surface of the receiving hole 621 to the outside.

As such, the present invention has a structure such that the main wire (B) of the optical fiber (OF) is removably inserted into and held by both the main wire connection member 700 and the main wire aligning member 300. Therefore, after inserting the main wire (B) into the main wire aligning member 300, a separate process of bonding the main wire (B) to the main wire aligning member 300 using a bonding agent, such as epoxy resin, is not required. As well, because replacing only the element wire (A) with another one is possible without replacement of the main aligning member 300, waste of resource is prevented.

In this embodiment, the main wire connection member 700 includes a flange holder 710. The flange holder 710 includes a main body 711 which has therein a coupling hole 711a, into which the main wire aligning member 300 is inserted, and at least one pair of optical fiber clamps 712, with an optical fiber receiving hole 712a defined between inner surfaces of the optical fiber clamps 712, so that the optical fiber (OF), inserted into the optical fiber receiving hole 712a, is held by the optical fiber clamps 712 into a clip type manner.

Furthermore, in this embodiment, the tightening member 800 has an optical fiber insertion hole 810, into which the optical fiber (OF) is inserted, and an optical fiber clamp receiving hole 820, into which the optical fiber clamps 712 are inserted so that the optical fiber clamps 712 are tightened, on an inner surface thereof. The tightening member 800 further has a locking protrusion 830 which is provided on an open end of the optical fiber clamp receiving hole 820. The flange holder 710 has a stopper 712c on an outer surface thereof, so that the tightening member 800 is removably coupled to the flange holder 710. Here, the reference numeral "712b" is a locking groove which is formed in the outer surface of each optical fiber clamp 712. The locking protrusion 830 of the tightening member 800 is temporarily hooked to the locking groove 712b.

Hereinafter, an optical line connecting process using the optical connector of the present invention will be explained.

First, the main wire aligning member 300 is coupled to the main wire connection member 700 such that the guide protrusion 323 of the main wire aligning member 300 is inserted into the coupling hole 711a of the flange holder 710. Thereafter, they are securely bonded together using a bonding agent such as epoxy resin.

Subsequently, the main wire aligning member 300 is inserted into the plug 200. The fastening member 500 is also inserted into and fastened to the plug 200, such that the fastening member 500 surrounds both a portion of the main wire connection member 300 and a portion of the main wire aligning member 300. At this time, the spring 400 is interposed between the main wire aligning member 300 and the fastening member 500, so that the main wire aligning member 300 is elastically supported by the spring 400 in one direction.

Thereafter, after an element wire (A) is sequentially inserted through the protective cover 600 and the tightening member 800, the main wire (B), from which a jacket is removed and which constitutes the free end of the element wire (A), is inserted into the main wire connection member 700, such that the main wire (B) of the element wire (A) is removably inserted into the main wire aligning member 300 through the main wire connection member 700. Subsequently, the locking protrusion 830 of the tightening member 800 is hooked to the stoppers 712c of the optical fiber clamps 712. Thereby, the optical fiber clamps 712 are tightened using the tightening member 800 so that the element wire (A) and/or the main wire (B) is securely held by the optical fiber clamps 712. Here, the main wire (B) passes through the main wire aligning member 300 and is exposed to the outside.

Thereafter, the portion of the main wire (B) that is exposed to the outside is cut off, and the end of the main wire (B) is ground. The protective cover 600, which is fitted over the element wire (A), is thereafter moved to and coupled to the fastening member 500. Subsequently, the plug 200 is inserted into the housing 100, thus completing the optical connector assembly.

Figure 6:
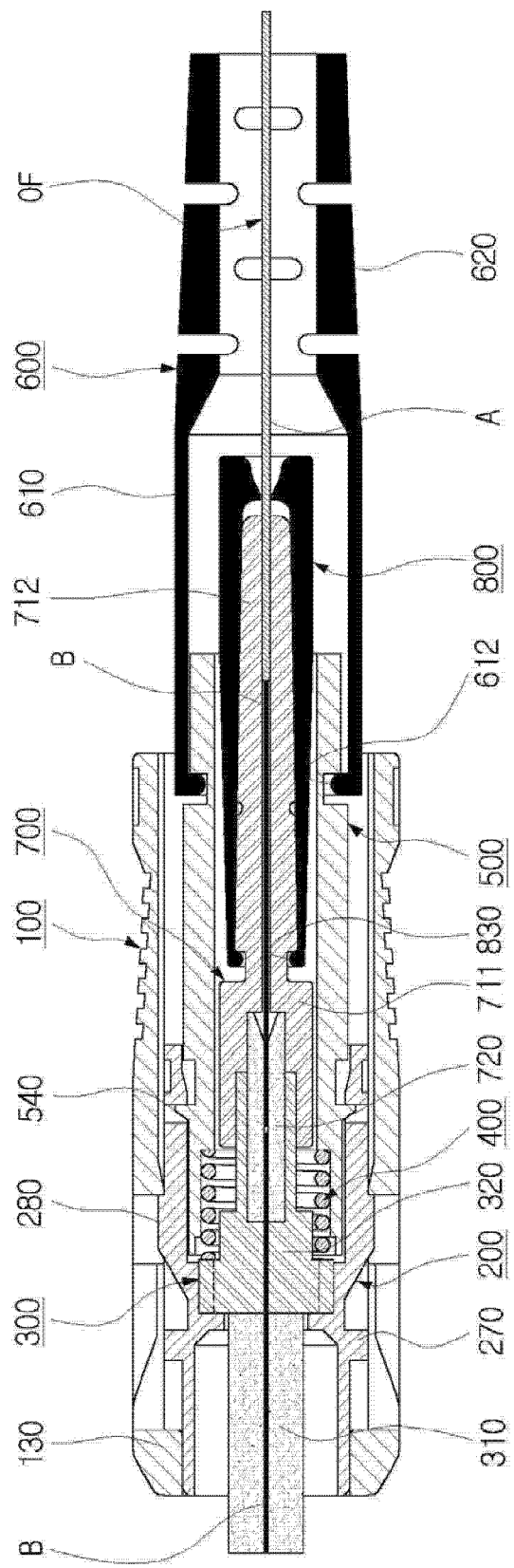
FIGS. 6 through 8 are views corresponding to FIGS. 3 through 5, but showing a modification of the optical connector according to the present invention.
Figure 7:
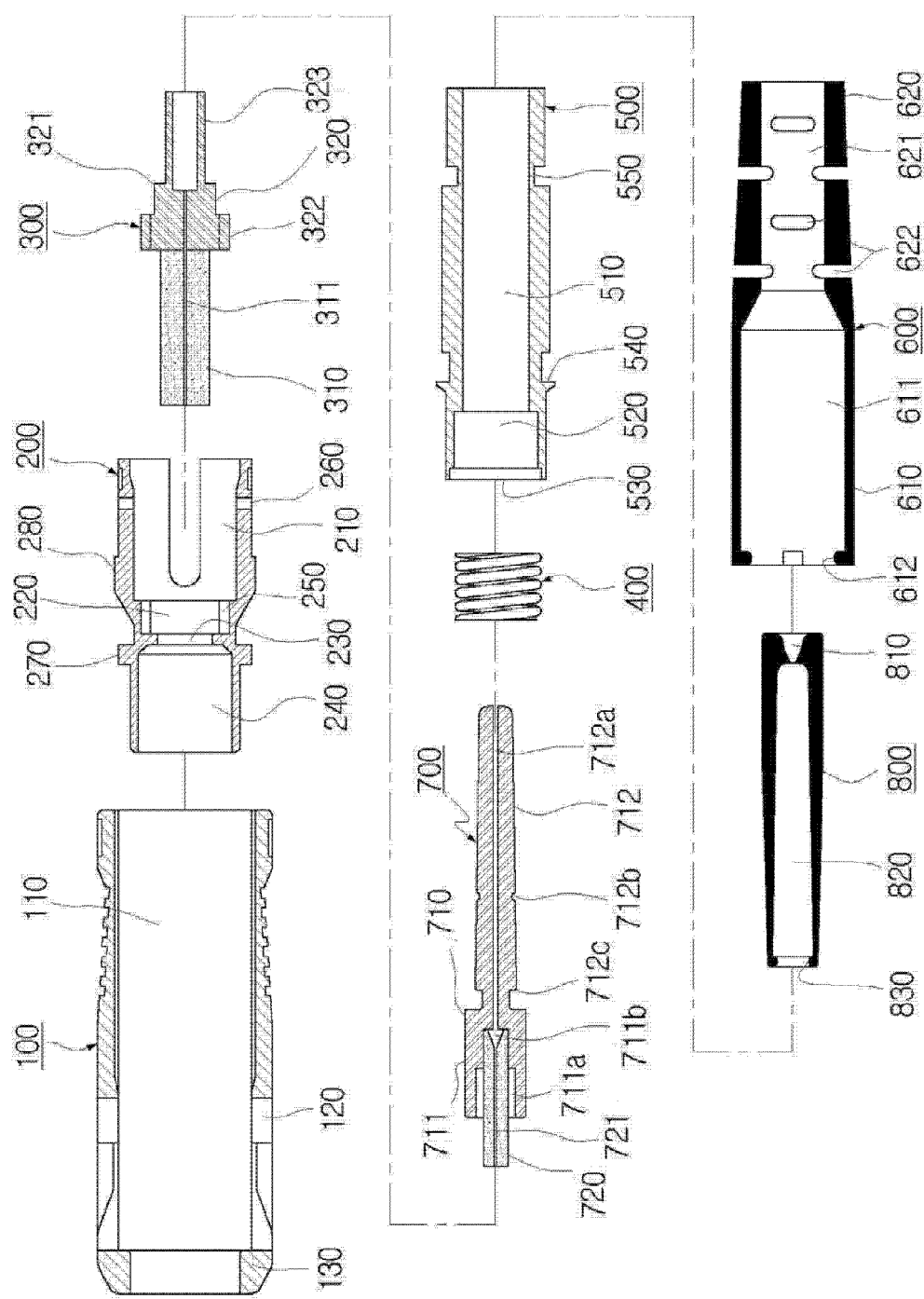
Figure 8:
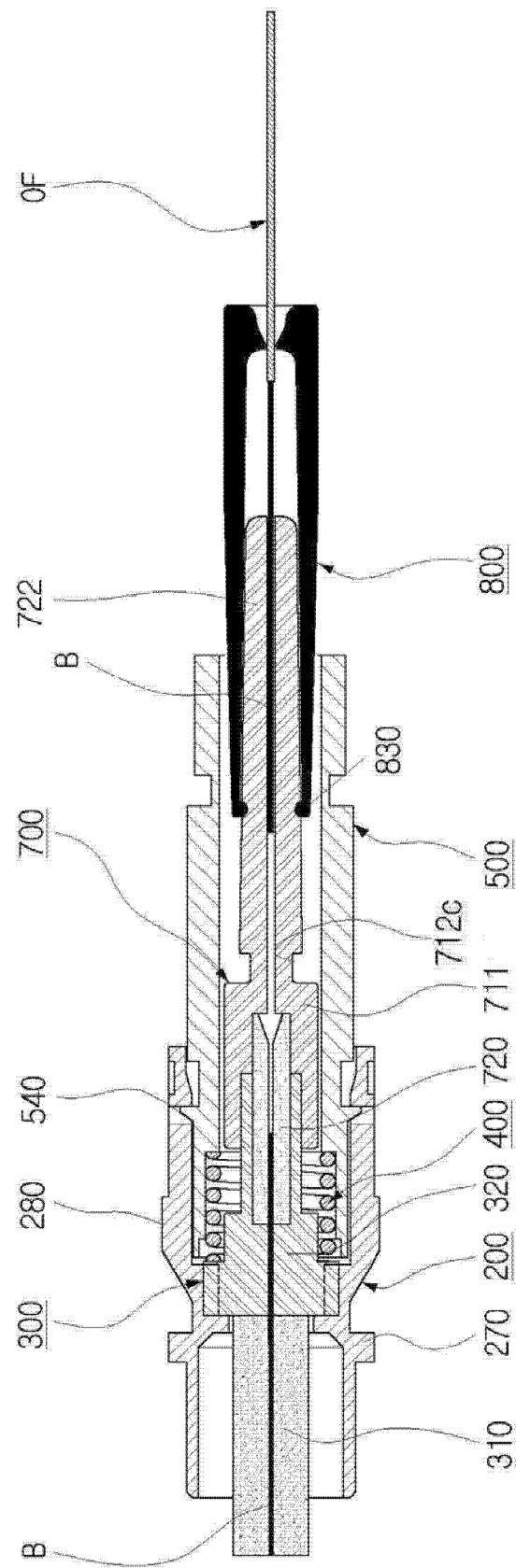

FIGS. 6 through 8 show an optical connector according to another embodiment of the present invention.

Referring to FIGS. 6 through 8, the optical connector according to this embodiment includes a separate subsidiary main wire (B') which is inserted into a second end of a main wire connection member 700 after being inserted through and attached to a main wire aligning member 300, so that the subsidiary main wire (B'), inserted through and attached to the main wire aligning member 300, and a main wire (B) of an optical fiber (OF), which is removably inserted into the main wire connection member 700, are coaxially brought into contact with each other in the main wire connection member 700, thus enabling optical communication.

Because the optical connector according to this embodiment has a structure in which the subsidiary main wire (B'), which is inserted through and attached to the main wire aligning member 300, and the main wire (B) of the optical fiber (OF), which is removably inserted into the main wire connection member 700, are coaxially connected to each other in the main wire connection member 700 such that optical communication can be conduced between them, optical fibers can be easily connected to each other in an optical line connection site without an increase in connection loss.

In this embodiment, the main wire connection member 700 includes a flange holder 710 and a ferrule 720. The flange holder 710 includes a main body 711 which has therein a coupling hole 711a, into which the main wire aligning member 300 is inserted, and a ferrule receiving hole 711b, into which the ferrule 720 is inserted. The flange holder 710 further includes at least one pair of optical fiber clamps 712, with an optical fiber receiving hole 712a defined between inner surfaces of the optical fiber clamps 712, so that the optical fiber (OF), inserted into the optical fiber receiving hole 712a, is held by the optical fiber clamps 712 into a clip type manner. The ferrule 720, through which a main wire insertion hole 721 is formed in a longitudinal direction, is inserted into the ferrule receiving hole 711b of the flange holder 710.

Hereinafter, an optical line connecting process using the optical connector of the present invention will be explained.

First, the subsidiary main wire (B') is inserted into the main wire aligning member 300 and is securely bonded to the main wire aligning member 300 by a bonding agent such as epoxy resin. At this time, a first end of the subsidiary main wire (B'), which is previously cut and ground, protrudes into a guide protrusion 323. Thereafter, a second end of the subsidiary main wire (B'), which protrudes outside through the ferrule 310, is cut and ground so as to reduce connection loss.

In this state, the guide protrusion 323 of the main wire aligning member 300 is inserted into the coupling hole 711a of the flange holder 710 while surrounding the ferrule 720 of the main wire connection member 700. Simultaneously, the first end of the subsidiary main wire (B') is inserted into a first end of the main wire insertion hole 721 of the ferrule 720 of the main wire connection member 700. As such, the main wire aligning member 300 and the main wire connection member 700 are coupled to each other. They are bonded together by a bonding agent such as epoxy resin.

Thereafter, the main wire aligning member 300 is inserted into the plug 200. The fastening member 500 is also inserted into and fastened to the plug 200, such that the fastening member 500 surrounds both a portion of the main wire connection member 300 and a portion of the main wire aligning member 300. At this time, a spring 400 is interposed between the main wire aligning member 300 and the fastening member 500, so that the main wire aligning member 300 is elastically supported by the spring 400 in one direction.

Subsequently, after an element wire (A) is sequentially inserted through the protective cover 600 and the tightening member 800, the main wire (B), from which a jacket is removed, and which constitutes the free end of the element wire (A), is inserted into the main wire connection member 700, such that the main wire (B) of the element wire (A) is inserted into a second end of the main wire insertion hole 721 of the ferrule 720 of the main wire connection member 700. Then, the main wire (B) is coaxially brought into contact with the subsidiary main wire (B'). Thereafter, the locking protrusion 830 of the tightening member 800 is hooked to the stoppers 712c of the optical fiber clamps 712. Thereby, the optical fiber clamps 712 are tightened using the tightening member 800 so that the element wire (A) and/or the main wire (B) is securely held by the optical fiber clamps 712. Here, preferably, a connection loss reduction agent such as index matching oil is injected into the main wire insertion hole 721 of the ferrule 720 of the main wire connection member 700, thus reducing reflection loss between the main wire (B) and the subsidiary main wire (B'). Thereafter, the protective cover 600, which is fitted over the element wire (A), is moved to and coupled to the fastening member 500. Subsequently, the plug 200 is inserted into the housing 100, thus completing the optical connector assembly.

According to this embodiment, as shown in FIG. 8, in a state in which the plug 200, the main wire aligning member 300, the spring 400, the fastening member 500, the main wire connection member 700 and the tightening member 800 are previously assembled together, a worker conducts only a process of inserting the element wire (A) into the main wire connection member 700, such that the main wire (B) coaxially faces the subsidiary main wire (B'), tightening the main wire connection member 700 using the tightening member 800 to fasten the element wire (A) to the main wire connection member 700, and assembling the protective cover 600 and the housing 100 on site. Therefore, the optical line connection work is markedly simplified and does not require the use of additional equipment.

Connection loss between the optical connector and an optical adaptor is greatly influenced by the cut and ground state of the end of the main wire (B'), which is exposed outside from the ferrule 310 of the main wire aligning member 300 to be mechanically connected to the optical adaptor. In this embodiment, because the subsidiary main wire (B'), which was previously processed to a fine tolerance in a place other than the optical line connection site, is used, the connection loss of the optical connector can be reduced. Furthermore, because a process of repairing or replacing the optical line with another one is conducted using a method in which only related optical fiber (OP) is repaired or replaced with another without replacement of the subsidiary main wire (B'), repair or replacement of the optical line can be easily conducted without reduction in connection loss.

For reference, a connection method in which the main wire (B) and the subsidiary main wire (B') are inserted into the ferrule 720 of the main wire connection member 700 in opposite directions such that they face each other is applied to this embodiment. Consequently, reliable connection between the main wire (B) and the subsidiary main wire (B') is ensured. Thus, when optical line connection work is conducted, even if a process of cutting and grinding the main wire (B) is conducted on site, that is, even if the cut and ground state of the main wire (B) is not precise, connection loss does not result, and dose not influence optical communication.

The present invention is not limited to the above-mentioned preferred embodiments, and those skilled in the art will appreciate that various modifications are possible, without departing from the scope of the invention as disclosed in the accompanying claims.

INDUSTRIAL APPLICABILITY

As describe above, in the present invention, an element wire (A) is removably fastened to the optical connector by tightening a main wire connection member 700 using a tightening member 800 from a state in which a plug 200, a main wire aligning member 300, a spring 400, a fastening member 500, the main wire connection member 700 and the tightening member 800 are previously assembled together. Consequently, only a related optical line need be repaired or replaced with another one, so that the optical line connection work is markedly simplified and can be performed conveniently. Furthermore, there is an advantage of efficient reuse of components.

The invention claimed is:

1. An optical connector, comprising: a housing surrounding and protecting components; a plug movably inserted in the housing; a main wire aligning member movably inserted in the plug; a fastening member inserted into the plug while surrounding a portion of the main wire aligning member protruding into the plug; a spring inserted into the fastening member and elastically supporting the main wire aligning member in one direction; and a protective cover covering an end of the fastening member, wherein the optical connector further comprises:
　　a main wire connection member inserted into the fastening member, having a front portion coupled to the main wire aligning member that protrudes into the fastening member, and having a rear portion fastened to the optical fiber that is inserted through the main wire connection member in a clip type manner; and
　　a tightening member inserted into the fastening member, surrounding the exterior surface of the main wire connection member, removably coupled to the main wire connection member, and tightening the rear portion of the main wire connection member such that the optical fiber is inserted through the main wire connection member in a clip type manner and is fastened to the main wire connection member, and thus a main wire of the optical fiber is serially inserted into the main wire aligning member so that the optical fiber is fastened to the main wire connection member according to the coupling structure between the main wire connection member and the tightening member.

2. The optical connector according to claim 1, wherein the main wire connection member comprises:
　　a flange holder, comprising: a main body, having therein a coupling hole, into which the main wire aligning member is inserted; and
　　at least one pair of optical fiber clamps, with an optical fiber receiving hole defined between inner surfaces of the optical fiber clamps, so that the optical fiber, inserted into the optical fiber receiving hole, is held by the optical fiber clamps into a clip type manner.

3. The optical connector according to claim 1, further comprising: a subsidiary main wire inserted through and attached to the main wire aligning member and inserted into a second end of the main wire connection member, so that the subsidiary main wire, inserted through and attached to the main wire aligning member, and the main wire of the optical fiber, removably inserted into the main wire connection member, are coaxially connected to each other in the main wire connection member, thus enabling optical communication.

4. The optical connector according to claim 3, wherein the main wire connection member comprises: a flange holder, comprising: a main body having therein a coupling hole, into which the main wire aligning member is inserted, and a ferrule receiving hole, into which a ferrule is inserted; and at least one pair of optical fiber clamps, with an optical fiber receiving hole defined between inner surfaces of the optical fiber clamps, so that the optical fiber, inserted into the optical fiber receiving hole, is held by the optical fiber clamps into a clip type manner; and the ferrule, inserted into the ferrule receiving hole of the flange holder, with a main wire insertion hole formed through the ferrule in a longitudinal direction.

5. The optical connector according to claim 2 or 4, wherein the flange holder comprises on an outer surface thereof a stopper, by which the tightening member, which has an optical fiber insertion hole, into which the optical fiber is inserted, and an optical fiber clamp receiving hole, into which the optical fiber clamps are inserted so that the optical fiber clamps are tightened, on an inner surface thereof, and which has a locking protrusion that is provided on an open end of the optical fiber clamp receiving hole so that a locking protrusion is removably hooked to the stopper of the flange holder, is removably coupled to the flange holder.

* * * * *